Feb. 19, 1929.

G. SCHAROWSKY 1,702,452

FREQUENCY CONVERTER

Filed Jan. 16, 1926

2 Sheets-Sheet 1

INVENTOR

Günther Scharowsky.

Patented Feb. 19, 1929.

1,702,452

UNITED STATES PATENT OFFICE.

GÜNTHER SCHAROWSKY, OF BERLIN-NIKOLASSEE, GERMANY, ASSIGNOR TO WESTINGHOUSE ELECTRIC & MANUFACTURING COMPANY, A CORPORATION OF PENNSYLVANIA.

FREQUENCY CONVERTER.

Application filed January 16, 1926, Serial No. 81,675, and in Germany January 17, 1925.

My invention relates to frequency converters, and it has particular relation to frequency converters arranged to operate at variable speeds.

Frequency converters such as have heretofore been used for interconnecting two networks of different frequencies have been of a so-called rigid type, wherein the amount of power that was transferred from one network to the other depended very closely upon the speed of the converter, and wherein there also existed a fixed relation between the frequencies of the networks and the speed of the dynamo-electric machines constituting the converter.

One object of my invention is to provide a frequency converter comprising two mechanically coupled dynamo-electric machine units, connected to two alternating-current lines of different frequencies, and so arranged as to permit independent control of the speed, power and frequency at which each unit operates.

Another object of my invention is to provide automatic means, responsive to the electrical conditions in one of the alternating-current lines, for controlling the speed of the frequency converter while independently maintaining a predetermined relation between the frequencies of the motor and the generator units of the converter.

A further object of my invention is to provide a frequency converter set associated with a flywheel arranged to give up kinetic energy in response to sudden demands of power.

Figure 1:
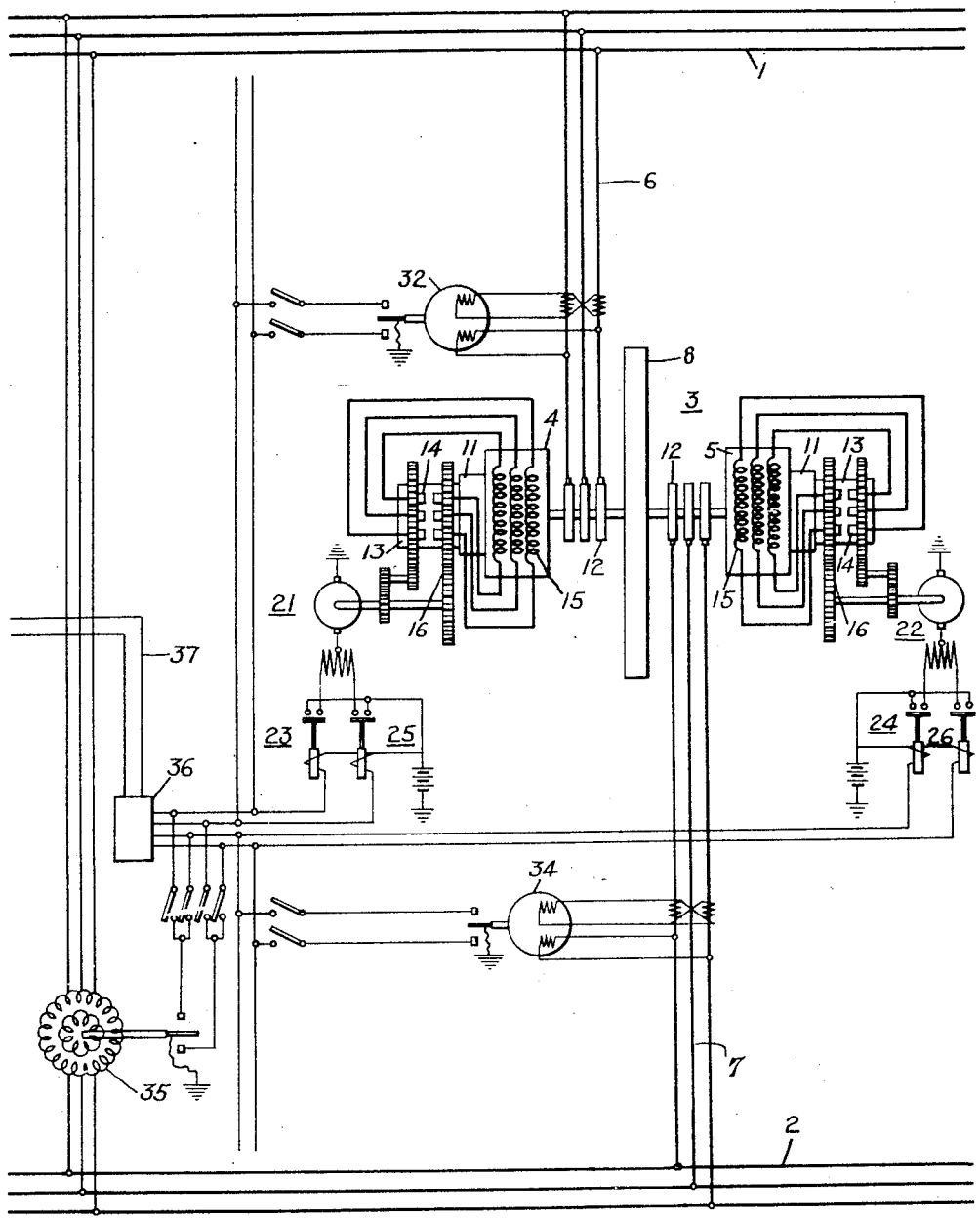
Figure 2:
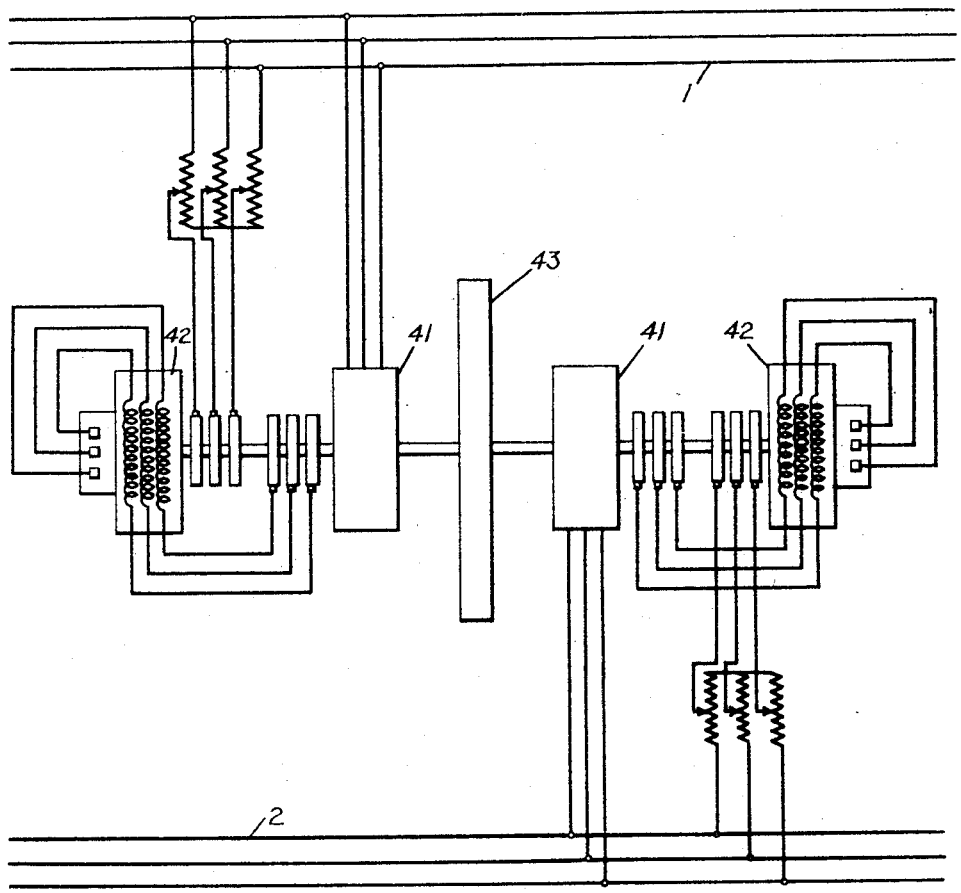

The foregoing and other objects of my invention will best be understood by reference to the accompanying drawing, wherein Figure 1 is a diagrammatic view of a frequency-converter system embodying my invention, and Fig. 2 is a view, similar to Fig. 1, embodying a modification of my invention.

Referring to Fig. 1, two alternating-current transmission lines 1 and 2, of different frequencies, are tied together by means of a frequency converter 3 comprising two mechanically coupled dynamo-electric machines 4 and 5, which are connected, through tie lines 6 and 7, to the two transmission lines 1 and 2, respectively. The converter 3 has a flywheel 8 associated therewith whereby the kinetic energy stored in the flywheel may be utilized to supply sudden power demands in the transmission line that is being supplied through the converter, without taking such power from the other transmission line.

The usual converters for interconnecting two networks of different frequencies, in order to transfer power from one network to the other, are not suitable for supplying sudden loads by means of flywheels, since the frequency ratio of the two networks fixes the speed of rotation of such converters, and it is necessary to vary the speed of the converter in order to make use of the kinetic energy stored in the flywheel.

According to my invention, the dynamo-electric machines constituting the motor and generator units of the converter are so constructed as to permit arbitrary adjustment of the no-load speed of the converter and to admit of independent control of the amount of load transmitted from the motor unit to the generator unit, without disturbing the frequency ratio of the two units.

In the embodiment of my invention shown in Fig. 1, the units 4 and 5 of the converter 3 are of the variable-speed type, as described in Ruedenberg Patent No. 1,305,011, issued May 27, 1919. The main machine of each unit comprises a rotor 11 provided with slip rings 12 and a commutator 13 cooperating with three sets of brushes 14 which are connected to three-phase windings 15 on the stator. The brushes are mounted upon rocker rings 16 which may be shifted to vary the speed of each machine unit independently of the frequency of the line to which it is connected. The slip rings of the two machines are connected to the two tie lines 6 and 7, respectively.

It is obvious that two machine units 4 and 5, of the above-described character, may be so controlled, by suitably shifting the brushes, that either one operates as a motor driving the other unit as a generator. For instance, if it is desired to supply power from the transmission line 1 to the transmission line 2, the brushes of the machine units 4 and 5 are adjusted so that the no-load speed of the machine unit 4, which is connected to line 1, is higher than the no-load speed of the machine unit 5. The machine unit 4 then drives the induction machine unit 5 above the no-load speed of the latter, causing the same to generate an alternating current flowing to the transmission line 2.

By simultaneously shifting the brushes of both machines 4 and 5, the no-load speed of both machines may be simultaneously increased or decreased, and hence the operating speed of the converter may be increased or decreased, while maintaining any desired difference between the no-load speeds of the two machines, thus rendering the converter speed independent of the amount of power transferred from one machine to the other.

The arrangement just described is particularly adapted for utilizing the kinetic energy of the flywheel for supplying sudden load demands in the network that is being fed from the converter. For example, if the converter is adjusted to run at a certain speed and a sudden load is thrown upon the network that is being supplied therefrom, for instance, on the transmission line 2, the speed of the converter set may be regulated downward by suitably adjusting the brushes of the two machine units, the flywheel giving off its kinetic energy and converting it into the electrical power which is being generated in the machine unit connected to the transmission line 2. Thus, by controlling the no-load speed of the machine unit acting as a generator, it is possible to utilize the energy derived from the flywheel to generate currents for supplying a sudden load demand on one of the networks, while maintaining the frequency of the generated current constant.

After the peak load on the transmission line 2 has subsided the speed of the converter 3 may again be increased, storing up energy in the flywheel to be used when the load demand is again excessive.

The control of the converter speed may be manual or automatic. In the system shown in Fig. 1, I have provided several sets of control devices for automatically controlling the speed of the converter in response to changes in the operating conditions in the systems to which the same is connected. The two machines are shown provided with brush-shifting motors 21 and 22, arranged to be driven in the one direction or the other, in response to the energization of under-speed relays 23, 24 and over-speed relays 25, 26, respectively. When an under-speed relay is energized, the associated brush-shifting motor 21 or 22 so moves the brushes as to increase the no-load speed of the associated converter unit. When an over-speed relay is energized, the brush-shifting motor operates to decrease the no-load speed of the associated converter unit.

There are a variety of combinations according to which the relays controlling the no-load speed of the two units of the converter aggregate may be caused to operate, depending upon the electrical conditions of the two lines to which the converter is connected.

As the load increases and the speed of the converter 3 decreases, the motor unit 4, would tend to draw an unduly large amount of power from the supply line 1, and in order to prevent such increase in the power drawn from the line 1, a power relay 32 may be connected in the tie line leading to the motor unit 4, the power relay controlling the brush shift of the said unit in such manner as to adjust its no-load speed to a value at which the power consumed thereby is below a predetermined value.

In addition to the power relay 32, I have also shown another similar relay 34 arranged to operate in a similar manner when power is being supplied from the transmission line 2 to the transmission line 1.

As an example of the control of the converter in the case where both networks have independent sources of alternating current of definite frequencies, I have shown a phase relay 35 which operates in response to changes in the phase relations of the voltages across the terminals of the two units of the converter. A dropping back in the phase position of the voltage vector at the terminals of the generator unit produces a brush shift in both machine units whereby the converter speed is decreased and the flywheel is caused to give up a part of its stored energy to the generator unit.

The operation of the brush-shifting motors of the two machine units of the converter 3 may also be controlled from a dispatcher's office (not shown) by means of a schematically-indicated remote control relay 36 that is operated from a suitable control line 37. The speed of the two units may then be regulated from a central supervisory station in response to the current or load conditions in the two lines.

In Fig. 2, I have shown a modification of my invention wherein each unit of the converter comprises a main induction machine 41 having concatenated therewith a commutator machine 42 which controls the speed of the main induction machine 41 in a well-known manner. The four machines are on a common shaft with a flywheel 43, as in the case of the converter shown in Fig. 1. By suitably controlling the no-load speeds of the two induction machine units the converter may be made to operate in the same manner as in Fig. 1.

Converters embodying great flexibility in controlling the speed, as well as the frequency and output according to my invention may be made in a variety of combinations of different machine units, and may be utilized with great advantage in many applications other than those mentioned hereinbefore.

I claim as my invention:

1. The combination with two alternating-current lines of different frequencies, of a motor-generator set for supplying power from one line to the other comprising two mechanically coupled dynamo-electric machine units connected to said lines, respectively, and means associated with said machine units for at will controlling the no-load speed of each of said units.

2. A motor-generator set comprising two mechanically coupled, alternating-current machine units, one unit being arranged to operate as a motor driving the other unit as a generator, a flywheel associated with said machine units, and means for, at will, controlling the no-load speed of each of said units.

3. The combination with two alternating-current lines of different frequencies, of a motor-generator set for supplying power from one line to the other comprising two mechanically coupled dynamo-electric machine units connected to said lines, respectively, means associated with the motor-generator set for at will controlling the no-load speeds of each of said machine units, and electro-responsive means responsive, in some manner, to the load conditions of one of said lines for controlling the speed of said motor-generator set.

4. The combination with two alternating-current lines of different frequencies, of a motor-generator set for supplying power from one line to the other comprising two mechanically coupled dynamo-electric machine units connected to said lines, respectively, a flywheel associated with said machine units, means associated with the motor generator set for at will controlling the no-load speeds of said machine units, and electro-responsive means responsive, in some manner, to the load conditions of one of said lines for reducing the speed of said set and causing said flywheel to give up some of its stored energy to the unit acting as a generator.

5. The combination with two alternating-current lines of different frequencies, of a motor-generator set for supplying power from one line to the other, comprising two mechanically coupled dynamo-electric machine units connected to said lines, respectively, a flywheel associated with said machine units, means associated with the motor-generator set for at will controlling the no-load speeds of each of said machine units, electro-responsive means responsive, in some manner, to the load conditions of one of said lines for reducing the speed of said set and causing said flywheel to give up some of its stored energy to the unit acting as a generator, and means for maintaining the power input into the motor-unit below a predetermined value independently of the speed of said set.

6. The combination with two alternating-current lines of different frequencies, of a motor-generator set for supplying power from one line to the other, comprising two mechanically coupled, dynamo-electric units connected to said lines, respectively, means associated with the motor-generator set for at will controlling the no-load speeds of each of said units, means responsive to the power demand of the supplied line for reducing the speed of said set, and means for maintaining the power transferred by the set below a predetermined value independently of the speed of said set.

7. The method of operating a motor-generator set comprising two mechanically coupled, alternating-current machine units interconnecting two alternating-current lines of different frequencies and having means for making variations of the no-load speeds of each of said units, which comprises reducing the speed of the motor-generator set and utilizing the stored kinetic energy of the set to generate currents for supplying the load while maintaining the frequency of said currents substantially independent of the speed of said set.

In testimony whereof, I have hereunto subscribed my name this 9th day of December, 1925.

GÜNTHER SCHAROWSKY.